US011054948B2

(12) United States Patent
Lee et al.

(10) Patent No.: US 11,054,948 B2
(45) Date of Patent: Jul. 6, 2021

(54) LIGHT TRANSMISSIVITY-CONTROLLED TOUCH SENSOR PANEL DESIGN

(71) Applicant: Apple Inc., Cupertino, CA (US)

(72) Inventors: Seung Hoon Lee, Santa Clara, CA (US); Ji Hun Choi, Los Gatos, CA (US); Chun-Hao Tung, San Jose, CA (US); Sunggu Kang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/585,957

(22) Filed: Sep. 27, 2019

(65) Prior Publication Data

US 2020/0110485 A1 Apr. 9, 2020

Related U.S. Application Data

(60) Provisional application No. 62/742,038, filed on Oct. 5, 2018.

(51) Int. Cl.
| | |
|---|---|
| G06F 3/045 | (2006.01) |
| G06F 3/044 | (2006.01) |
| G06F 3/041 | (2006.01) |

(52) U.S. Cl.
CPC ............ *G06F 3/044* (2013.01); *G06F 3/0412* (2013.01); *G06F 3/0418* (2013.01); *G06F 2203/04103* (2013.01); *G06F 2203/04112* (2013.01)

(58) Field of Classification Search
USPC ................ 345/173, 174, 175, 156, 176, 179
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee et al., "A Multi-Touch Three Dimensional Touch-Sensitive Tablet", CHI'85 Proceedings, Apr. 1985, pp. 21-25.

(Continued)

*Primary Examiner* — Thuy N Pardo
(74) *Attorney, Agent, or Firm* — Kubota & Basol LLP

(57) ABSTRACT

A touch sensor panel is disclosed. In some examples, the touch sensor panel includes a substrate including a first side and a second side, a passivation layer, a first plurality of touch electrodes formed on the first side of the substrate, and a second plurality of touch electrodes formed on the second side of the substrate. In some examples, a component of the touch sensor panel, other than the first plurality of touch electrodes and the second plurality of touch electrodes, is configured to prevent light configured to activate the passivation layer during fabrication of the touch sensor panel from being transmitted from the first side of the substrate to the second side of the substrate.

14 Claims, 11 Drawing Sheets

(56) References Cited

U.S. PATENT DOCUMENTS

| | | |
|---|---|---|
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 9,733,750 B2 | 8/2017 | Park et al. |
| 2006/0197753 A1 | 9/2006 | Hotelling |
| 2013/0113713 A1* | 5/2013 | Mienko ............... G06F 3/0443 345/173 |
| 2014/0354601 A1* | 12/2014 | Bita ................... G02B 6/0055 345/175 |
| 2015/0346866 A1* | 12/2015 | Kusunoki ......... G06F 3/04166 345/174 |
| 2015/0375341 A1* | 12/2015 | Chan .................. G06F 3/0445 264/400 |
| 2016/0041656 A1* | 2/2016 | Bita .................. G02B 26/001 345/175 |
| 2016/0306477 A1* | 10/2016 | Lee .................... G06F 1/1652 345/173 |
| 2017/0301860 A1 | 10/2017 | Yamazaki et al. |
| 2018/0024393 A1* | 1/2018 | Cheng ............... G06F 3/0412 345/174 |
| 2018/0088717 A1* | 3/2018 | Chen ............... G02F 1/136204 345/174 |
| 2018/0277795 A1 | 9/2018 | Liu et al. |
| 2018/0309079 A1* | 10/2018 | Matsumoto ......... H01L 51/5203 345/173 |
| 2019/0339557 A1* | 11/2019 | Tominaga ............ G02F 1/1368 345/173 |
| 2020/0033983 A1* | 1/2020 | Chen ................. G02F 1/13454 345/156 |
| 2020/0285334 A1* | 9/2020 | Kusunoki ............ G06F 3/0412 345/176 |

OTHER PUBLICATIONS

Rubine, Dean H., "Combining Gestures and Direct Manipulation", CHI'92, May 3-7, 1992, pp. 659-660.

Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

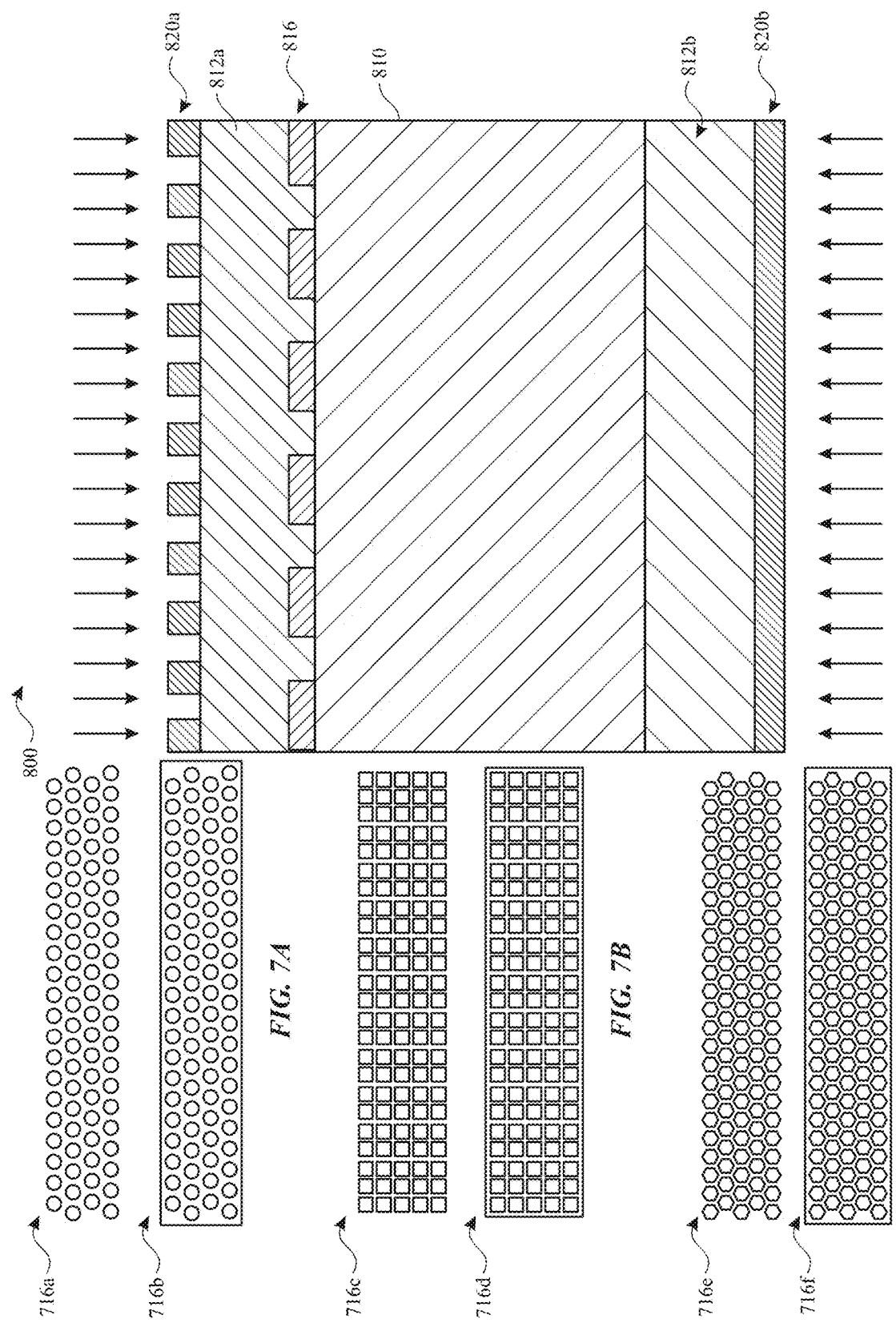

LIGHT TRANSMISSIVITY-CONTROLLED TOUCH SENSOR PANEL DESIGN

CROSS-REFERENCE TO RELATED APPLICATION

This application claims the benefit of U.S. Provisional Application No. 62/742,038, filed Oct. 5, 2018, the entire disclosure of which is incorporated herein by reference for all purposes.

FIELD OF THE DISCLOSURE

This relates generally to touch sensor panels, and more particularly to touch sensor panel designs that control the transmission of light, for activating passivation layers in the touch sensor panels, from one side of the substrate of the touch sensor panels to the other.

BACKGROUND OF THE DISCLOSURE

Many types of input devices are presently available for performing operations in a computing system, such as buttons or keys, mice, trackballs, joysticks, touch sensor panels, touch sensor panels and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch sensor panels can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch sensor panel, as described above. Some touch sensor panels can be formed by at least partially integrating touch sensing circuitry into a display pixel stackup (i.e., the stacked material layers forming the display pixels).

SUMMARY OF THE DISCLOSURE

Examples of the disclosure are directed to various touch sensor panel designs that include structure and/or process steps for controlling the amount of light that reaches the other side of the substrate of the touch sensor panels during fabrication, thus preventing unwanted photo-activation of passivation layers during the fabrication. Some examples include an integrated attenuation mask. In some examples, the attenuation mask is solid and in some examples the attenuation mask is patterned. Some examples include a light-absorptive substrate. Some examples include a light-absorptive layer formed on the substrate.

BRIEF DESCRIPTION OF THE DRAWINGS

FIGS. 7A-7C illustrate various patterns of an attenuation mask and/or light-absorptive layer in a touch sensor panel stackup according to some examples of the disclosure.

FIG. 8 illustrates an example of the disclosure in which a patterned glass mask is used in conjunction with a patterned attenuation mask (or light-absorptive layer) to control the final intensity of light reaching the other side of a substrate of the touch sensor panel according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Examples of the disclosure are directed to various touch sensor panel designs that include structure and/or process steps for controlling the amount of light that reaches the other side of the substrate of the touch sensor panels during fabrication, thus preventing unwanted photo-activation of passivation layers during the fabrication. Some examples include an integrated attenuation mask. In some examples, the attenuation mask is solid and in some examples the attenuation mask is patterned. Some examples include a light-absorptive substrate. Some examples include a light-absorptive layer formed on the substrate.

Figure 1A:
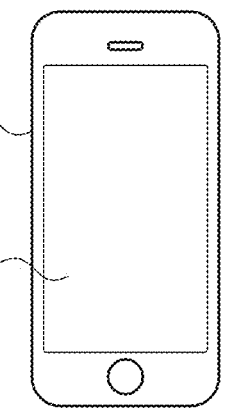
FIGS. 1A-1E illustrate example systems that can use light-transmissivity controlling techniques according to examples of the disclosure.
Figure 1B:
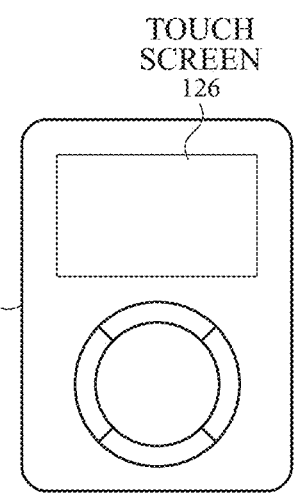
Figure 1C:
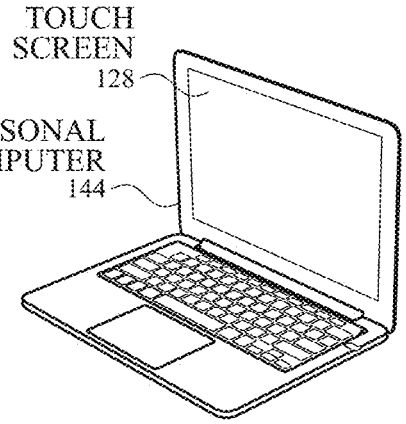
Figure 1D:
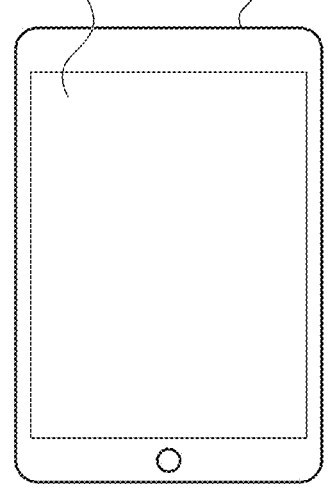
Figure 1E:
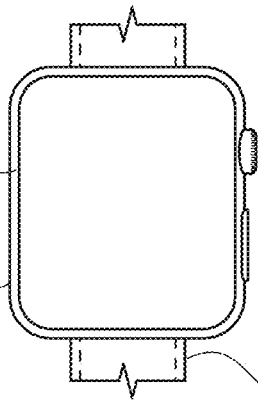

FIGS. 1A-1E illustrate example systems that can use light-transmissivity controlling techniques according to examples of the disclosure. FIG. 1A illustrates an example mobile telephone 136 that includes a touch screen 124 that can use light-transmissivity controlling techniques according to examples of the disclosure. FIG. 1B illustrates an example digital media player 140 that includes a touch screen 126 that can use light-transmissivity controlling techniques according to examples of the disclosure. FIG. 1C illustrates an example personal computer 144 that includes a touch screen 128 that can use light-transmissivity controlling techniques according to examples of the disclosure. FIG. 1D illustrates an example tablet computing device 148 that includes a touch screen 130 that can use light-transmissivity controlling techniques according to examples of the disclosure. FIG. 1E illustrates an example wearable device 150 that includes a touch screen 132 and can be attached to a user using a strap 152 and that can use light-transmissivity controlling techniques according to examples of the disclosure. It is understood that a touch screen and light-transmissivity controlling techniques can be implemented in other devices as well. Additionally it should be understood that although the disclosure herein primarily focuses on touch screens, the disclosure of light-transmissivity controlling techniques can be implemented for devices including touch sensor panels (and displays) that may not be implemented as a touch screen.

In some examples, touch screens 124, 126, 128, 130 and 132 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch sensor panel can include a plurality of individual touch electrodes, each touch electrode identifying or representing a unique location (e.g., a touch node) on the touch sensor panel at which touch or proximity is to be sensed, and each touch node electrode being electrically isolated from the other touch node electrodes in the touch sensor panel/panel. Such a touch sensor panel can be referred to as a pixelated self-capacitance touch sensor panel, though it is understood that in some examples, the touch node electrodes on the touch sensor panel can be used to perform scans other than self-capacitance scans on the touch sensor panel (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch sensor panel. In some examples, the touch node electrodes of a self-capacitance based touch system can be formed from rows and columns of conductive material, and changes in the self-capacitance to ground of the rows and columns can be detected, similar to above. In some examples, a touch sensor panel can be multi-touch, single touch, projection scan, full-imaging multi-touch, capacitive touch, etc.

In some examples, touch screens 124, 126, 128, 130 and 132 can be based on mutual capacitance. A mutual capacitance based touch system can include electrodes arranged as drive and sense lines (e.g., as described below with reference to FIG. 4A) that may cross over each other on different layers (in a double-sided configuration), or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch sensor panel. As described herein, in some examples, a mutual capacitance based touch system can form touch nodes from a matrix of small, individual plates of conductive material.

In some examples, touch screens 124, 126, 128, 130 and 132 can be based on mutual capacitance and/or self-capacitance. The electrodes can be arrange as a matrix of small, individual plates of conductive material (e.g., as in touch node electrodes 408 in touch sensor panel 402 in FIG. 4B) or as drive lines and sense lines (e.g., as in row touch electrodes 404 and column touch electrodes 406 in touch sensor panel 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
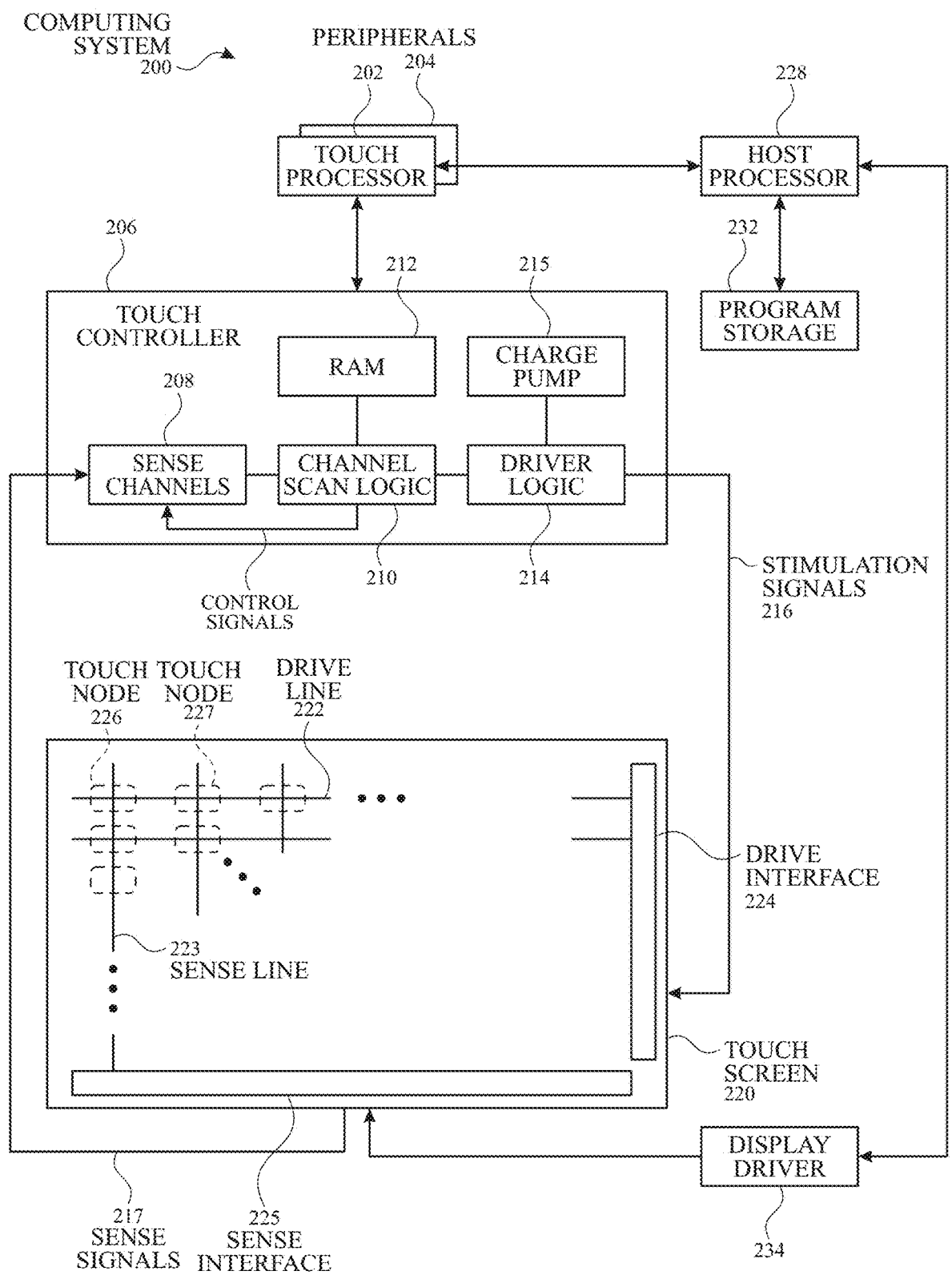
FIG. 2 illustrates an example computing system including a touch sensor panel that can use light-transmissivity controlling techniques according to examples of the disclosure.

FIG. 2 illustrates an example computing system including a touch screen that can use light-transmissivity controlling techniques according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
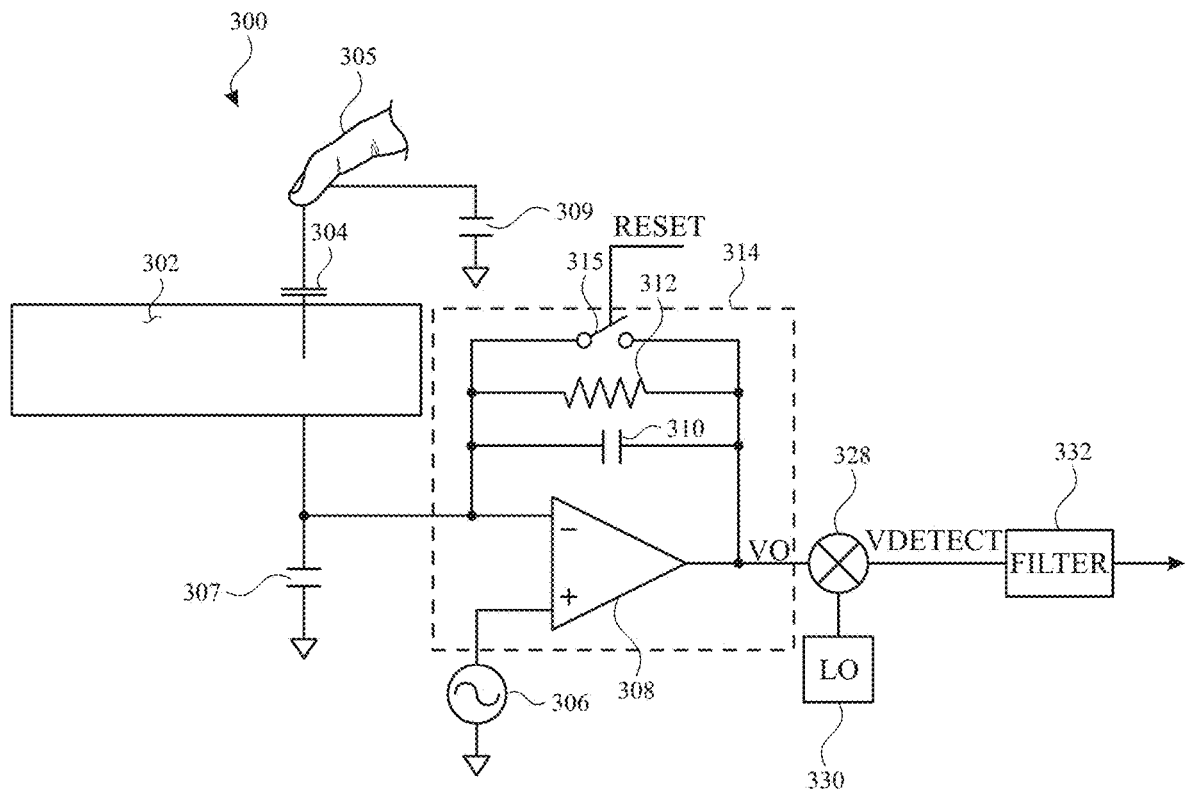
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch sensor panel 400 or a touch node electrode 408 of touch sensor panel 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
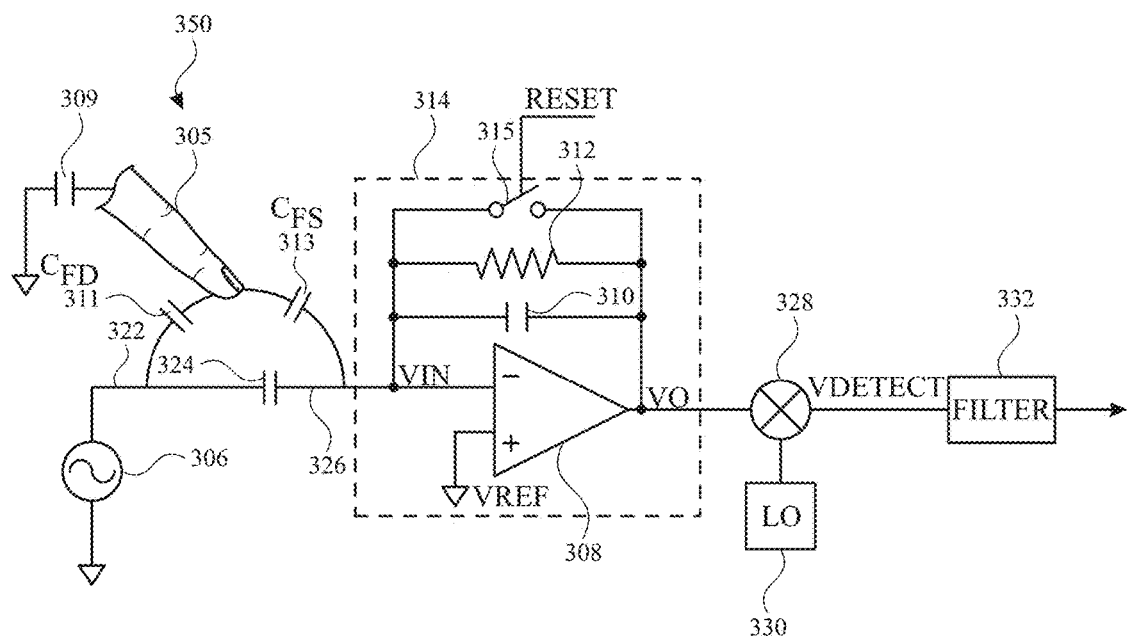
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as $V_{in}$) can be inputted into the inverting input of operational amplifier 308, and the non-inverting input of the operational amplifier can be coupled to a reference voltage $V_{ref}$. Operational amplifier 308 can drive its output to voltage $V_o$ to keep yin substantially equal to $V_{ref}$ and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
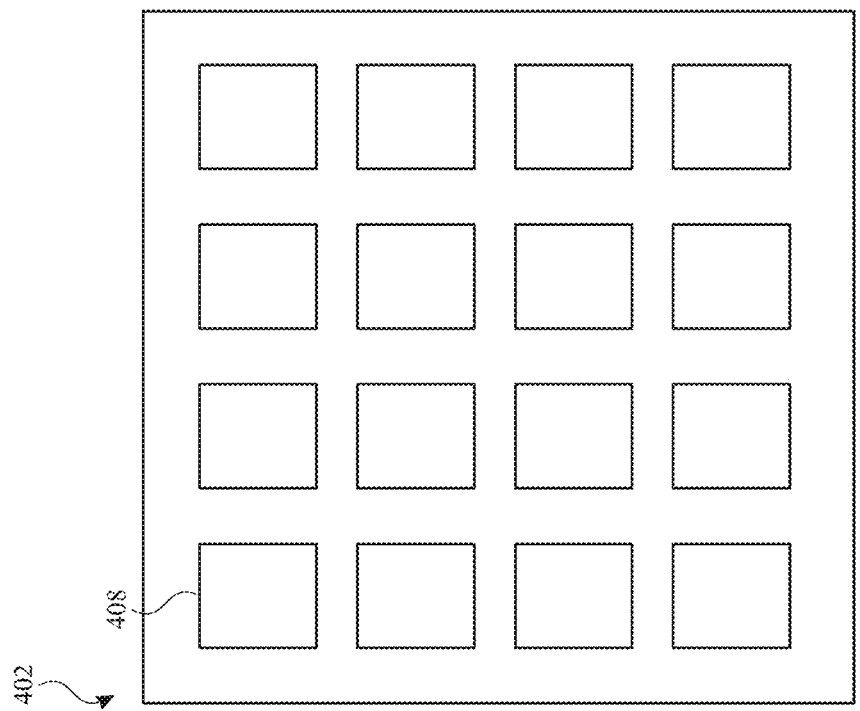
FIG. 4B illustrates touch sensor panel with touch node electrodes arranged in a pixelated touch node electrode configuration according to examples of the disclosure.
Figure 4A:
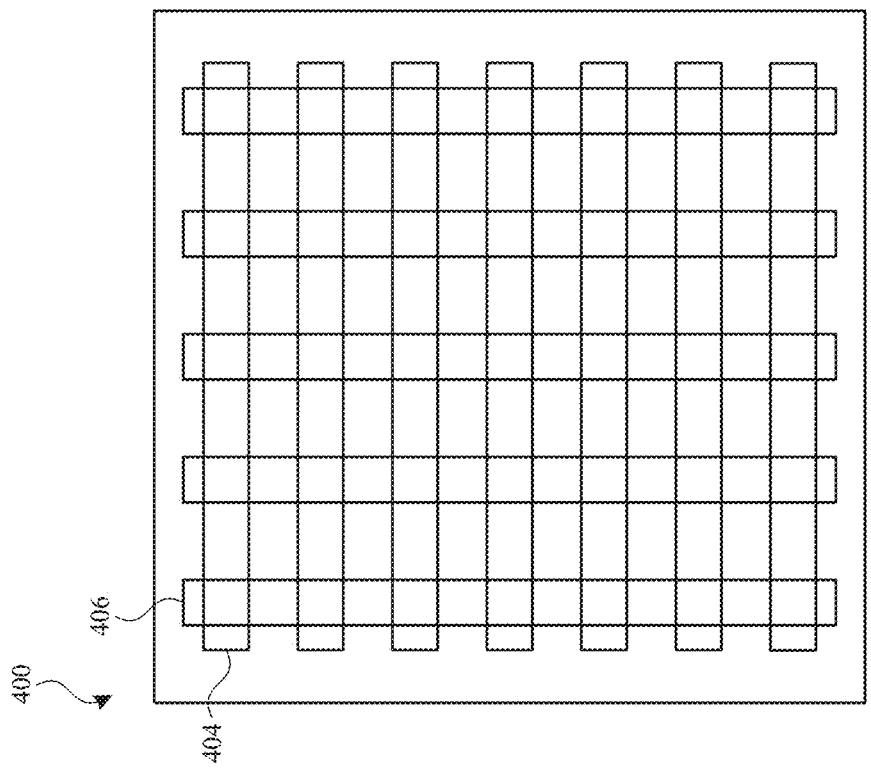
FIG. 4A illustrates touch sensor panel with touch electrodes arranged in rows and columns according to examples of the disclosure.

FIG. 4A illustrates touch sensor panel 400 with touch electrodes 404 and 406 arranged in rows and columns according to examples of the disclosure. Specifically, touch sensor panel 400 can include a plurality of touch electrodes 404 disposed as rows, and a plurality of touch electrodes 406 disposed as columns. Touch electrodes 404 and touch electrodes 406 can be on the same or different material layers on touch sensor panel 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch sensor panel 400 can sense the self-capacitance of touch electrodes 404 and 406 to detect touch and/or proximity activity on touch sensor panel 400, and in some examples, touch sensor panel 400 can sense the mutual capacitance between touch electrodes 404 and 406 to detect touch and/or proximity activity on touch sensor panel 400.

FIG. 4B illustrates touch sensor panel 402 with touch node electrodes 408 arranged in a pixelated touch node electrode configuration according to examples of the disclosure. Specifically, touch sensor panel 402 can include a plurality of individual touch node electrodes 408, each touch node electrode identifying or representing a unique location on the touch sensor panel at which touch or proximity (i.e., a touch or proximity event) is to be sensed, and each touch node electrode being electrically isolated from the other touch node electrodes in the touch sensor panel/touch screen, as previously described. Touch node electrodes 408 can be on the same or different material layers on touch sensor panel 402. In some examples, touch sensor panel 402 can sense the self-capacitance of touch node electrodes 408 to detect touch and/or proximity activity on touch sensor panel 402, and in some examples, touch sensor panel 402 can sense the mutual capacitance between touch node electrodes 408 to detect touch and/or proximity activity on touch sensor panel 402.

Figure 5A:
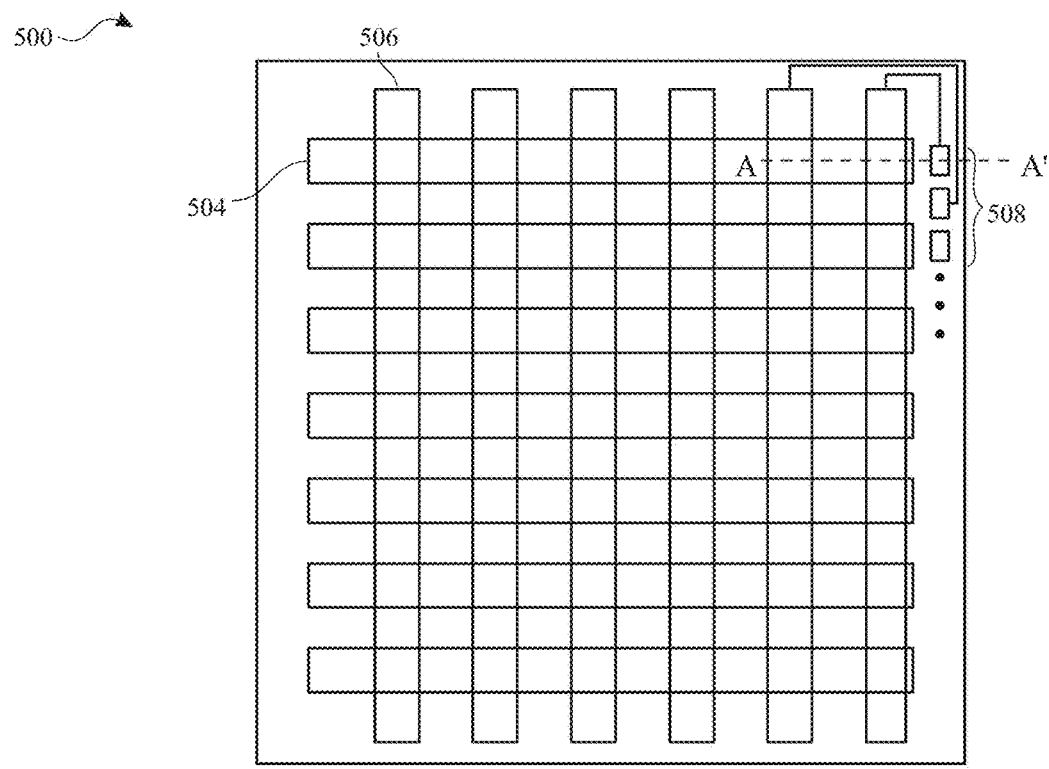
FIG. 5A illustrates a touch sensor panel with column electrodes and row electrodes according to examples of the disclosure.

FIG. 5A illustrates touch sensor panel 500 with a plurality of column electrodes 506 and a plurality of row electrodes 504 according to examples of the disclosure. In some examples, touch sensor panel 500 can include one or more touch electrodes disposed as columns that form column electrodes 506 (e.g., single contiguous electrodes, or non-contiguous electrodes electrically coupled together using electrical bridges), and one or more touch electrodes disposed as rows that form row electrodes 504 (e.g., single contiguous electrodes, or noncontiguous electrodes electrically coupled together using electrical bridges), similar to touch sensor panel 400 described above with reference to FIG. 4A. It should be understood that in some examples, touch sensor panel 500 can include a matrix of touch node electrodes, in a manner similar to touch sensor panel 402 described above with reference to FIG. 4B.

Touch screen 500 can also include bond pads 508 that can facilitate electrical connections between row 504 and/or column electrodes 506 and other circuitry (e.g., touch sensing circuitry, driving circuitry, etc.). For example, touch sensor panel 500 can include bond pads 508 in the border region of touch sensor panel 500 (e.g., a region of the touch sensor panel that is peripheral to the location of the touch electrodes 504 and 506 and optionally one or more display pixels) that can be electrically connected to column electrodes 506 via traces. Touch sensor panel 500 can similarly include other bond pads 508 in the border region of touch sensor panel 500 for electrically connecting to other column electrodes 506 and row electrodes 504 on touch sensor panel. It is understood that in some examples, bond pads 508 can be outside of the border region, such as on a tail that is bent behind the touch sensor panel.

In some examples, touch electrodes 504 and 506 can be disposed on a touch sensor panel substrate. The substrate can include a rigid or flexible material to support the touch electrodes 504 and 506 and any other material layers included in the touch sensor panel stackup. In some examples, the substrate can include two or more substrate layers joined together by an adhesive. In some examples, it can be desirable for a passivation layer to cover all or substantially all of one side of the touch sensor panel substrate (e.g., while the other side has no or partial coverage of the passivation layer), at least in certain regions of the touch sensor panel, such as in the border regions of the touch sensor panel (e.g., to help guard against physical stress that can cause damage to the various parts of the touch sensor panel stackup, such as electrodes 504/506) during fabrication.

In instances where a photosensitive passivation layer is used on both sides of the substrate during the fabrication of the touch sensor panel, it can be difficult to achieve full coverage of the passivation layer on one side of the substrate when the other side has no coverage or partial coverage of the passivation layer. In some examples, the substrate can be substantially transparent (e.g., to allow for the touch sensor panel to be overlaid on or integrated with a display, such as in a touch screen), which can allow light (e.g., UV light) that is used to activate the photosensitive passivation layer during fabrication to pass through the substrate from one side of the substrate to the other. When light passes through the substrate in this way, the passivation layer can be activated in areas where photo-activation was not desired.

Figure 5B:
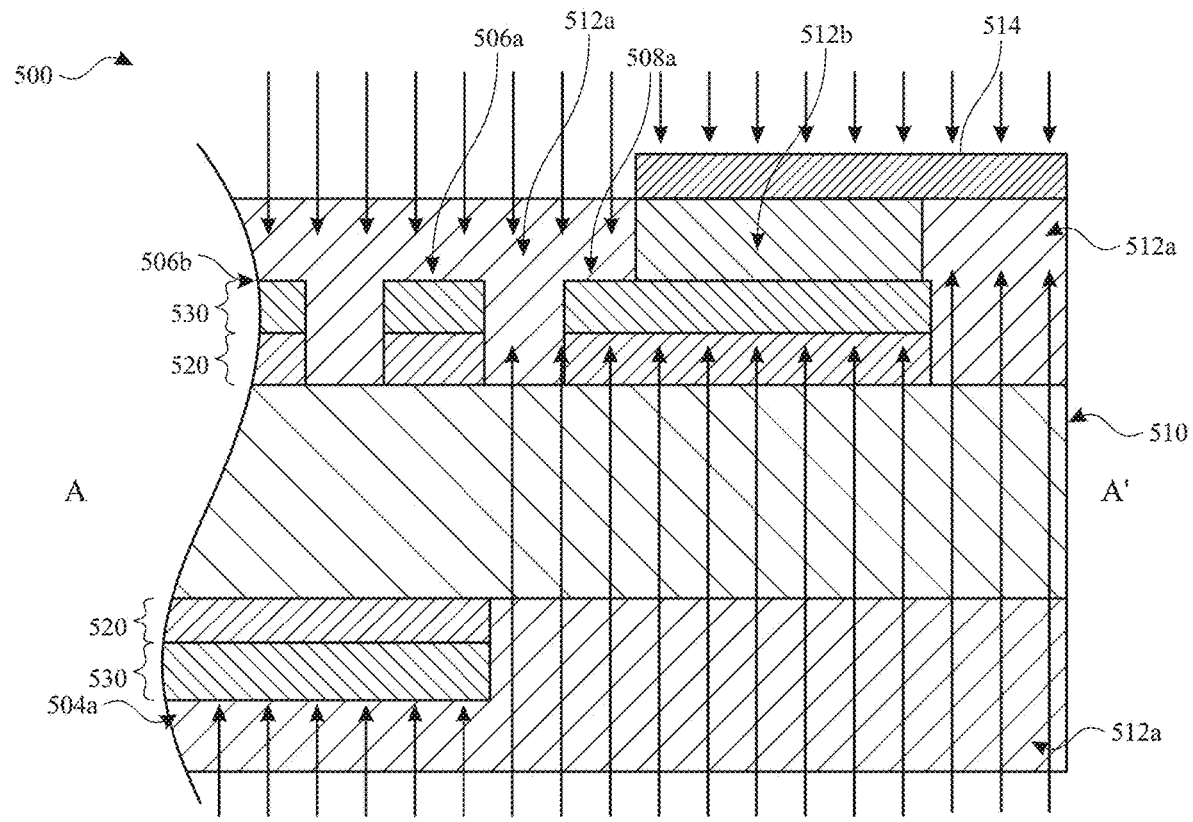
FIGS. 5B-5C illustrate a cross section of the touch sensor panel in FIG. 5A during an exemplary fabrication process for the touch sensor panel according to some examples of the disclosure.

For example, FIG. 5B illustrates a cross section 502 of touch sensor panel 500 at A to A' in FIG. 5A during an exemplary fabrication process for touch sensor panel 500 according to some examples of the disclosure. Cross section 502 can include substrate 510, which can be the substrate on which the touch sensor panel is formed. As mentioned previously, substrate 510 can be transparent or substantially transparent (e.g., glass, plastic, etc.) to allow the touch sensor panel to be used in applications where light should be able to pass through the touch sensor panel during operation (e.g., as in a touch screen). In the example of FIG. 5B, electrodes 506a and 506b (corresponding to column electrodes 506 in FIG. 5A) bond pad 508a (corresponding to a bond pad 508 in FIG. 5A) can be formed on the top side of substrate 510. The bond pad 508a can be electrically connected to one (or more) of electrodes 506. Electrode 504a (corresponding to row electrodes 504 in FIG. 5A) can be formed on the bottom side of substrate 510. Thus, in the example of FIG. 5B, all row electrodes 504 can be formed on the bottom side of substrate 510, and all column electrodes 506 can be formed on the top side of substrate 510, though it is understood that in some examples this can be reversed. Moreover, in some examples, the touch sensor panel 500 can include touch node electrodes similar to the touch node electrodes 408 of touch screen 402. In examples where touch sensor panel 500 includes touch node electrodes, the touch node electrodes can be formed on one or both sides of substrate 510.

In some examples, electrodes 504 and 506, and bond pads 508 can each be formed of two layers: 1) a indium tin oxide (ITO) layer 520 that is formed on substrate 510, and 2) a second metal layer 530 (e.g., copper, aluminum, gold, etc.) that is formed on the ITO layer. Once those two layers 520 and 530 have been formed and patterned, a passivation layer 512 can be formed (e.g., deposited, coated, laminated, etc.) on top of electrodes 504 and 506 on both sides of substrate 510, as shown in FIG. 5B.

The passivation layer 512 can be a photosensitive passivation layer, for example. In some examples, the passivation layer 512 can be formed by depositing a material layer and exposing portions of the material to light with particular characteristics (e.g., sufficient intensity, certain wavelengths, etc., such as UV light). The light can photo-activate portions of the material layer, causing those portions to remain in subsequent process steps (e.g., a post-activation rinse). In some examples, portions of material that are not exposed to light with the particular characteristics are not photo-activated and can therefore be removed in subsequent process steps.

In some examples, it can be desired to remove the passivation layer 512 from at least a portion of the bond pad 508a on substrate 510 (e.g., so that electrical contact can be made to bond pad 508a, and thus to the electrode 506 to which bond pad 508a is coupled). After passivation layer 512 has been formed on both sides of substrate 510, a masking layer 514 can be formed over at least a portion of bond pad 508a on the top side of substrate 510, such in the area of the touch sensor panel where bond pad 508a is located (e.g., in the border region). In some examples, no masking layer is formed on the bottom side of substrate 510.

Figure 5C:
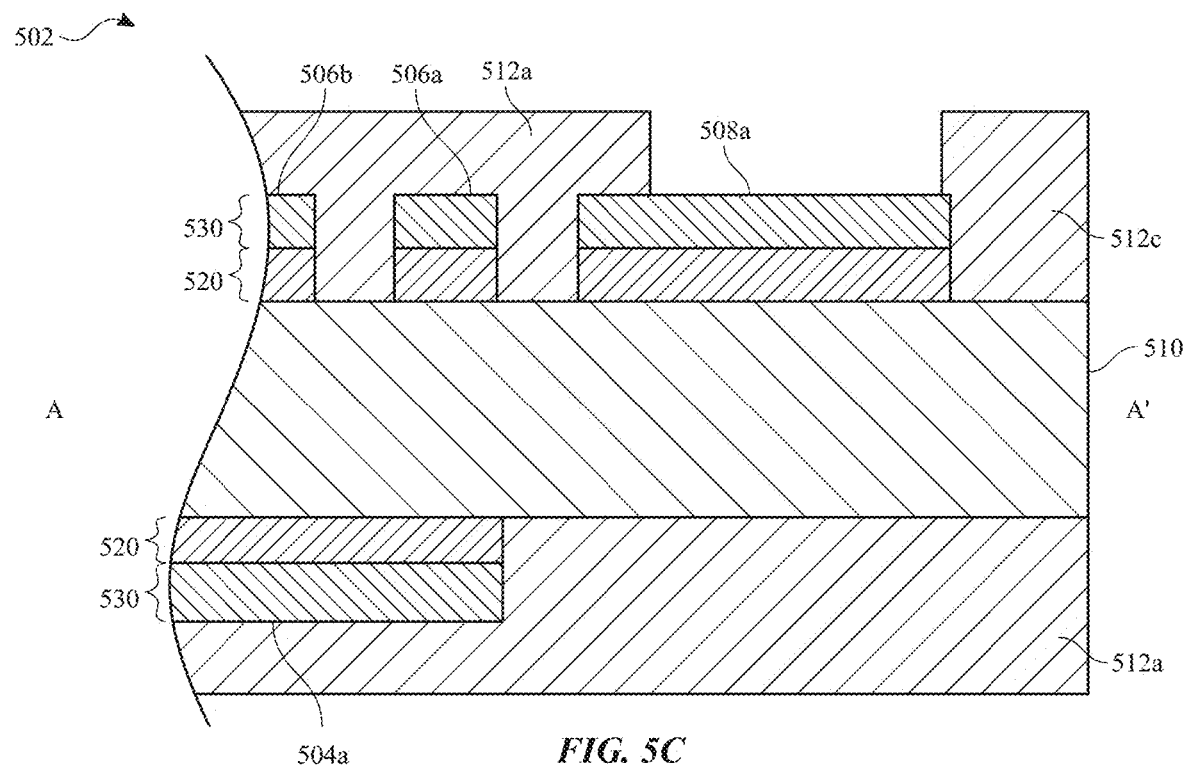

After forming the masking layer 514, light can be directed towards substrate 510 from both the top and bottom sides of substrate 510. The light can cause photo-activation of portions 512a of passivation layer 512, without photo-activating of portions 512b of passivation layer 512. In particular, in some examples, the ITO layer 520 and metal layer 530 forming electrodes 504 and 506 and bond pad 508a, and masking layer 514, can be substantially opaque to the light used to photo-activated passivation layer 512. Thus, light directed towards substrate 510 from above can terminate at masking layer 514 and areas that include electrodes 506a or bond pad 508a, and light directed towards substrate 510 from below can terminate at electrode 504a. However, light directed towards substrate 510 from below in areas outside of electrode 504a (e.g., below bond pad 508) can pass through substrate 510 and activate portions of passivation layer 512 that are under masking layer 514. Specifically, passivation layer portion 512a under masking layer 514 can be activated by light directed towards substrate 510 from below. In some examples, in subsequent process steps, non-activated regions 512b of passivation layer 512 can be removed, while activated regions 512a of the passivation layer 512 can remain. Thus, in some examples, portions 512a of passivation layer 512 can remain in undesired regions of the touch sensor panel (e.g., in the border region of the touch sensor panel outside of bond pad 508a), as shown in FIG. 5C. In particular, a portion 512c of the passivation layer to the right of bond pad 508a in FIG. 5C can be undesirable passivation coverage.

It is understood that while FIGS. 5B and 5C have been described with reference to bond pad 508a on the top side of substrate 510 that is connected to an electrode 506, bond pads formed on the bottom side of substrate 510 that are connected to respective electrodes 504 can also require passivation layer 512 removal to allow for electrical contact to those bond pads. The above-described problem can similarly occur with respect to such bond pads on the bottom side of substrate 510, with the relevant details simply being reversed from the top side of substrate 510 to the bottom side of substrate 510 (e.g., the masking layer 514 can be formed on the bottom side of substrate 510 over such bond pads, and undesired activation of portions of passivation layer 512 can result from light entering from the top side of substrate 510 and passing through to the bottom side of substrate).

FIGS. 6-11 illustrate various examples of the disclosure that can address the above issue. FIG. 6A illustrates an exemplary touch sensor panel stackup 600 having an integrated an attenuation mask 616 according to some examples of the disclosure. In particular, the details of FIG. 6A can be that of FIG. 5B, except where otherwise noted, and FIG. 6A can continue to illustrate a cross-section A to A' of the touch sensor panel of FIG. 5A.

Stackup 600 can include an integrated attenuation mask 616. Attenuation mask 616 can be formed of and in the same materials/layers as electrodes 504a on the bottom side of substrate 610 (e.g., an ITO layer 620 formed on substrate 610, and a second metal layer 630 formed on the ITO layer). The attenuation mask 616 can be disposed between the passivation layer 612 on the bottom side of substrate 610 and substrate 610. Thus, attenuation mask 616 can be patterned during the same patterning step used to pattern electrodes 504a on the bottom side of substrate 610. In some examples, attenuation mask 616 can be formed throughout the bottom side of substrate 610, and in other examples, attenuation mask 616 may only be formed on the bottom side of substrate 610 in the bond pad/border regions of the touch sensor panel (e.g., outside of areas of the touch sensor panel in which electrodes 504 are formed).

Figure 6A:
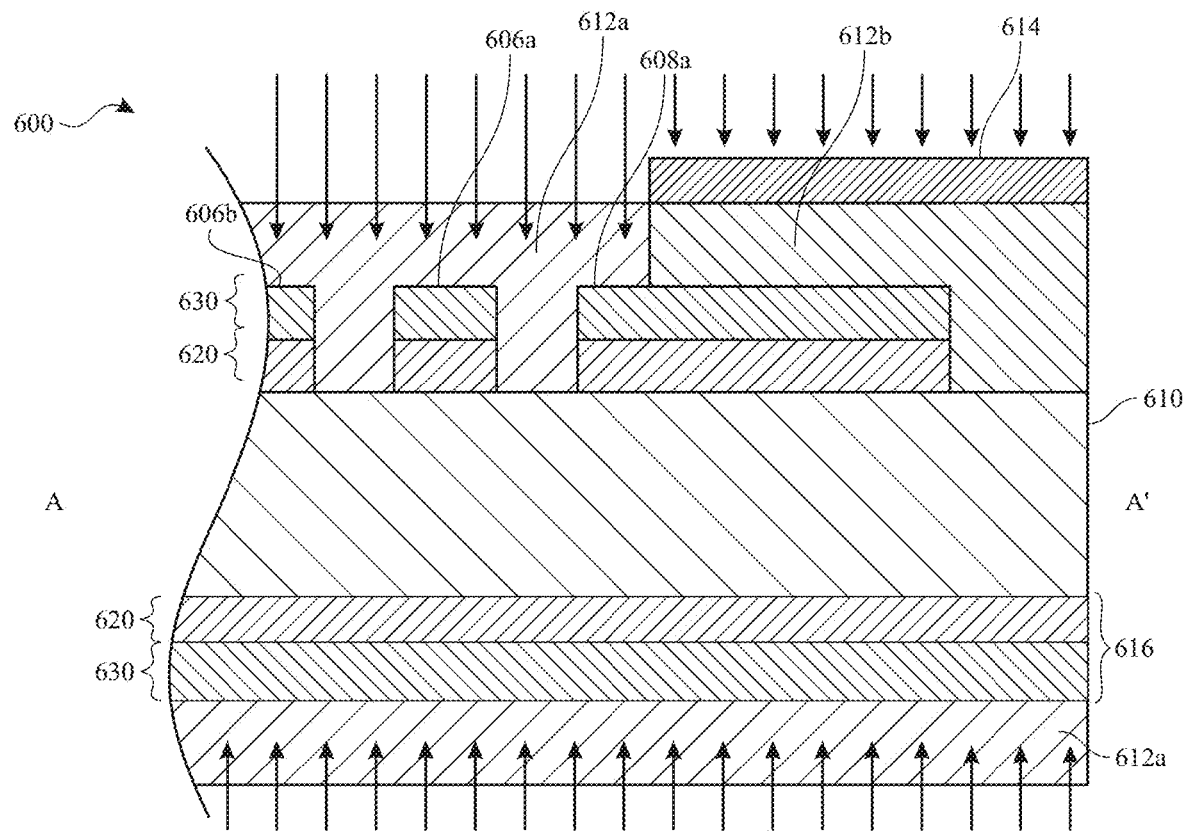
FIG. 6A illustrates an example of the disclosure in which an attenuation mask is integrated into the touch sensor panel stackup according to some examples of the disclosure.

With the inclusion of attenuation mask 616 on the bottom side of substrate 610, as shown in FIG. 6A, light directed towards substrate 610 from below can terminate at attenuation mask 616 and/or electrodes 504, rather than passing through to passivation layer 612 on the top side of substrate 610. Thus, the activation of regions of the passivation layer 612 on the top side of substrate can be controlled by light directed towards substrate 610 from above, without being impacted by light directed towards substrate 610 from below. Therefore, mask layer 614, for example, can define regions 612a of the passivation layer to be activated by the light and regions 612b of the passivation layer not to be activated by the light on the top side of substrate 610. It is understood that the examples of FIG. 6A can equally be applied to areas of the touch sensor panel at which bond pads on the bottom side of substrate 610 are located (e.g., bond pads that electrically couple to electrodes 504 on the bottom side of substrate 610). In such examples, attenuation mask 616 would be formed on the top side of substrate 610, and mask layer 614 would be formed on the bottom side of substrate 610, for example.

Figure 6B:
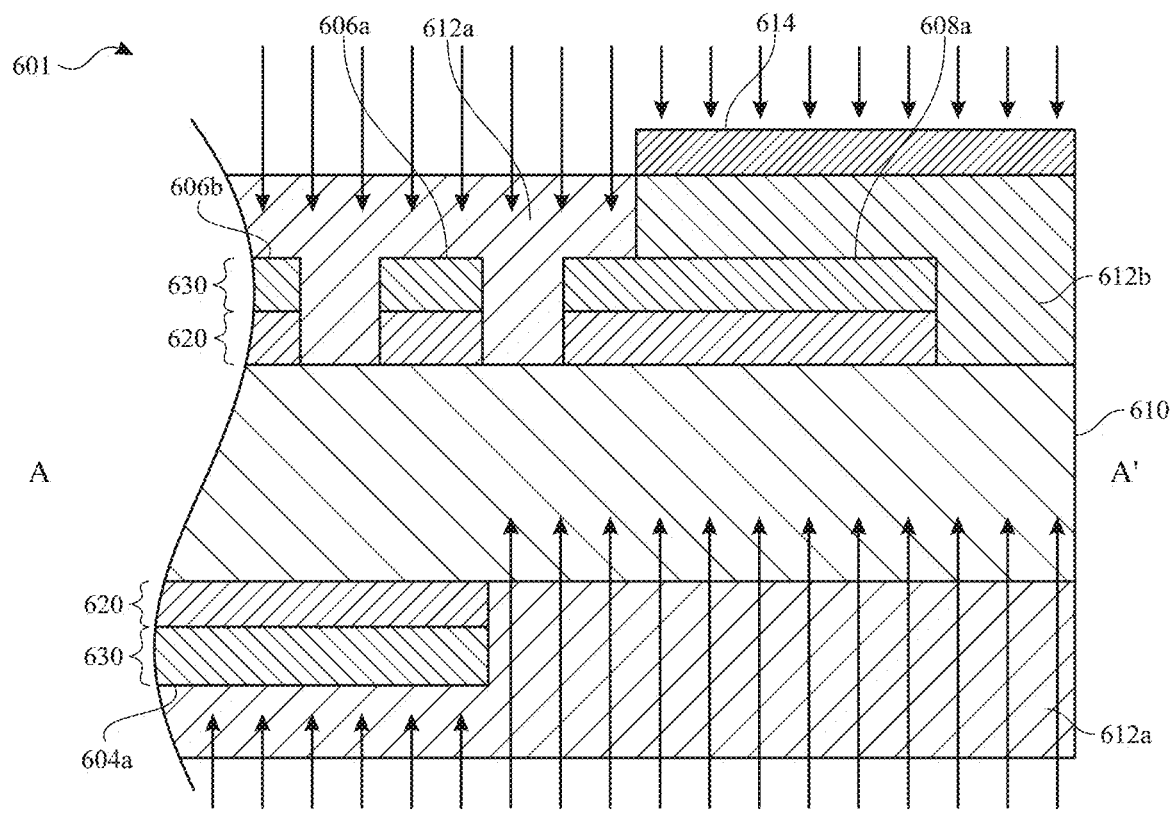
FIG. 6B illustrates an example of the disclosure in which a substrate in a touch sensor panel stackup is light-absorptive according to some examples of the disclosure.

FIG. 6B illustrates an exemplary touch sensor panel stackup 601 including a light-absorptive substrate 610 according to some examples of the disclosure. In particular, the details of FIG. 6B can be that of FIG. 5B, except where otherwise noted, and FIG. 6B can continue to illustrate a cross-section A to A' of the touch sensor panel of FIG. 5A.

Substrate 610 can be a substrate that is substantially not light-transmissive (e.g., transmissivity less than or equal to a transmissivity threshold that only allows light through substrate 610 at intensities less than the activation intensity threshold of passivation layer 612). In some examples, substrate 610 can be transmissive to visible light (e.g., to maintain usability with a touch screen) but not transmissive to light used to activate passivation layer 612 (e.g., UV light). In other words, the substrate 610 can have higher transmissivity for visible light and lower transmissivity for passivation layer-activation light. In some example, substrate 610 can have bulk material properties that results in such transmissivity, and in some examples, substrate 610 can include one or more layers (e.g., not bulk) that are light-absorptive and that result in such transmissivity.

In the example of FIG. 6B, similar to as described with reference to FIG. 6A, as shown in FIG. 6B, light directed towards substrate 610 from below can terminate at or within substrate 610 and/or electrodes 604, rather than passing through to passivation layer 612 on the top side of substrate 610. Thus, the activation of regions of the passivation layer 612 on the top side of substrate can be controlled by light directed towards substrate 610 from above, and not light directed towards substrate 610 from below. Therefore, mask layer 614, for example, can define regions 612a of the passivation layer that can be activated by the light and regions 612b of the passivation layer that may not be activated by the light on the top side of substrate. It is understood that the examples of FIG. 6B can equally be applied to areas of the touch sensor panel at which bond pads on the bottom side of substrate 610 are located (e.g., bond pads that electrically couple to electrodes 604 on the bottom side of substrate 610). In such examples, mask layer 614 would be formed on the bottom side of substrate 610, for example.

Figure 6C:
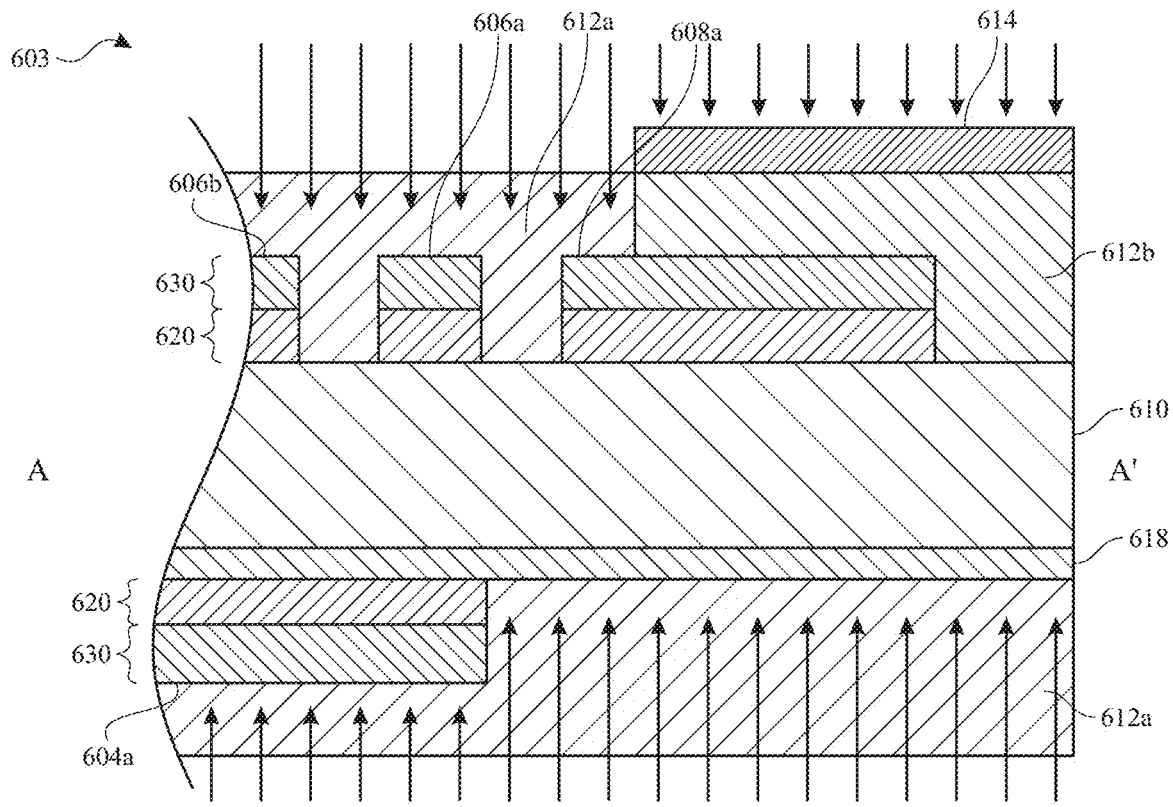
FIG. 6C illustrates an example of the disclosure in which a light-absorptive layer is formed on a substrate in a touch sensor panel stackup according to some examples of the disclosure.

FIG. 6C illustrates an exemplary touch sensor panel stackup 603 including a light-absorptive layer 618 according to some examples of the disclosure. In particular, the details of FIG. 6C can be that of FIG. 5B, except where otherwise noted, and FIG. 6C can continue to illustrate a cross-section A to A' of the touch sensor panel of FIG. 5A.

In some examples, a light-absorptive layer 618 can be formed on substrate 610 (e.g., on substrate 610, between the ITO/metal layers that form electrodes 604 and 606 and bond pads 608, and substrate 610). In some examples, light-absorptive layer 618 can be blanket formed across the entirety of substrate 610, on the top and/or bottom surfaces of substrate 610, and/or formed only in certain regions of substrate 610 (e.g., in the bond pad/border regions of the touch sensor panel, such as outside of areas of the touch sensor panel in which electrodes 604/606 are formed). Light-absorptive layer 618 can be a material layer that is substantially not light-transmissive (e.g., transmissivity less than or equal to a level that only allows light through substrate 610 at intensities less than the activation intensity threshold of passivation layer 612). In some examples, light-absorptive layer 618 can be transmissive to visible light (e.g., to maintain usability with a touch screen) but not transmissive to light used to activate passivation layer 612 (e.g., UV light). In other words, the light-absorptive layer 618 can have higher transmissivity for visible light and lower transmissivity for passivation layer-activation light.

In the example of FIG. 6C, similar to as described with reference to FIGS. 6A and 6B, as shown in FIG. 6C, light directed towards substrate 610 from below can terminate at or within light-absorptive layer 618 and/or electrodes 604, rather than passing through to passivation layer 612 on the top side of substrate 610. Thus, the activation of regions of the passivation layer 612 on the top side of substrate can be controlled by light directed towards substrate 610 from above, and not light directed towards substrate 610 from below. Therefore, mask layer 614, for example, can define regions 612a of the passivation layer 612 that can be activated by the light and regions 612b of the passivation layer that may not be activated by the light on the top side of substrate 610 (e.g., regions of passivation layer 612 on the top side of substrate 610 under mask layer 614 can remain non-activated). It is understood that the examples of FIG. 6C can equally be applied to areas of the touch sensor panel at which bond pads on the bottom side of substrate 610 are located (e.g., bond pads that electrically couple to electrodes 504 on the bottom side of substrate 610). In such examples, mask layer 614 would be formed on the bottom side of substrate 610, for example.

As mentioned above, attenuation mask 616 and/or light-absorptive layer 618 may only be sufficiently opaque to the light used to activate passivation layer 612 such that the intensity of light that reaches the other side of substrate 610 is below the activation intensity threshold of passivation layer 612. Thus, while in some examples, attenuation mask 616 and/or light-absorptive layer 618 can be contiguous/solid, in other examples, attenuation mask 616 and/or light-absorptive layer 618 can be patterned. FIGS. 7A-7C illustrate exemplary patterns that can be applied to attenuation mask 616 and/or light-absorptive layer 618 according to some examples of the disclosure. Attenuation mask 616 and/or light-absorptive layer 618 can be formed with a pattern, such as circle patterns in FIG. 7A, square patterns in FIG. 7B, or hexagon patterns in FIG. 7C. In some examples, electrodes 504/506 can be solid or patterned in the same way as attenuation mask 616 and/or light-absorptive layer 618. As long as attenuation mask 616 and/or light-absorptive layer 618 are patterned such that the intensity of the light that reaches the other side of substrate 610 is below the activation intensity threshold of passivation layer 612, the results of FIGS. 6A-6C can be achieved.

In some examples, the intensity of light able to pass through patterned attenuation mask 616 and/or light-absorptive layer 618 can be a function of the pattern size/shape of the attenuation mask 616 and/or light-absorptive layer 618. Additionally, in some examples, it can be beneficial to pattern attenuation mask 616 and/or light-absorptive layer 618 rather than have them be solid material layers for various reasons. For example, material corrosion considerations can dictate a patterned attenuation mask 616 and/or light-absorptive layer 618, which can prevent corrosion that might occur at the edge of the touch sensor panel (e.g., due to die cutting) from propagating further into the touch sensor panel (which might occur if attenuation mask 616 and/or light-absorptive layer 618 were solid, contiguous materials). As another example, a patterned attenuation mask 616 can reduce parasitic capacitive coupling that might exist between bond pads 608 and the attenuation mask 616 that is opposite the bond pads 608 on substrate 610 (e.g., by reducing the area of the attenuation mask 616). Alternatively, in some examples, attenuation mask 616 can be formed of a solid, contiguous material layer (e.g., ITO plus other metal) that can be floating or coupled to a reference voltage (e.g., ground, other reference voltage, etc.) to reduce parasitic capacitive coupling that might exist between bond pads 608 and the attenuation mask 616 that is opposite the bond pads 608 on substrate 610.

With respect to patterning of attenuation mask 616 and/or light-absorptive layer 618, in some examples, the opaque areas of attenuation mask 616 and/or light-absorptive layer 618 can be larger than the metal patterning resolution of the fabrication process used, the transparent areas of attenuation mask 616 and/or light-absorptive layer 618 can be smaller than the passivation layer patterning resolution of the fabrication process used, and/or attenuation mask 616 and/or light-absorptive layer 618 can be designed/patterned such that the final light intensity that is able to reach the passivation layer on the other side of substrate 610 is less than the activation intensity threshold of the passivation layer. For example, the attenuation mask 616 and/or light-absorptive layer 618 pattern can be made up of a number of unit cells (e.g., rectangular- or square-shaped) of which a certain portion is opaque (e.g., includes metal or light-absorptive layer) and a remaining portion is transparent (e.g., does not include metal or light-absorptive layer). In some examples, the lateral dimensions of the unit cell (e.g., in both axes) can range from a minimum feature size of the metal pattern (e.g., 5, 10, 15 um) to a minimum pattern size of the passivation layer (e.g., 25, 30, 35 um). In some examples, the lateral dimensions of the unit cell (e.g., in both axes) can range from 1×UV wavelength (e.g., 364 nm, I-line) to 100×UV wavelength (36.4 nm, I-line).

In some examples, a separate, patterned glass mask can be combined with the attenuation mask 616 and/or light-absorptive layer 618 examples disclosed above to further control or refine the transmissivity of the light-controlling examples of the disclosure. FIG. 8 illustrates an exemplary touch sensor panel stackup 800 including a patterned glass mask 820 and a patterned attenuation mask 816 (or light-absorptive layer) to control the final intensity of light reaching the other side of substrate 610 according to examples of the disclosure. The stackup 800 can include passivation layers 812 on the top and bottom of substrate 810, patterned attenuation mask 816 on the top side of substrate 810 (e.g., between the passivation layer 812 on the top side of substrate 810 and substrate 810), and a patterned glass mask 820a on top of the passivation layer 812 on the top side of substrate 810. A non-patterned glass mask 820b can be on the bottom side of passivation layer 812 on the bottom side of substrate 810.

In some examples, the patterns of glass mask 820a and attenuation mask 816 can be such that, together, the light directed towards substrate 810 from above can be attenuated to below the activation intensity threshold of passivation layer 812 by the time the light reaches the bottom side of substrate 810. Further, solid glass mask 820b can prevent light directed towards substrate 810 from below from activating the passivation layer 812 on the bottom side of substrate 810. As such, after the light-activation step of the fabrication process, passivation layer 812a can be activated (e.g., by light from above), and passivation layer 812b can be non-activated. Glass mask 820a and attenuation mask 816 can be patterned pursuant to the criteria previously described to achieve the above-described results, and it is understood that, as above, glass mask 820a and/or attenuation mask 816 can be utilized on the top and/or bottom sides of substrate 810, depending on which side of substrate 810 should not include a passivation layer. Combining glass mask 820a with attenuation mask 816 allows the use of less metal area in the attenuation mask 816 layer (e.g., which would allow for more light to pass through the attenuation mask 816 layer) that might otherwise be used, which can be beneficial if problems associated with more metal in the attenuation mask 816 layer are observed (e.g., parasitic capacitance and/or corrosion-related problems, as previously discussed).

Figure 9A:
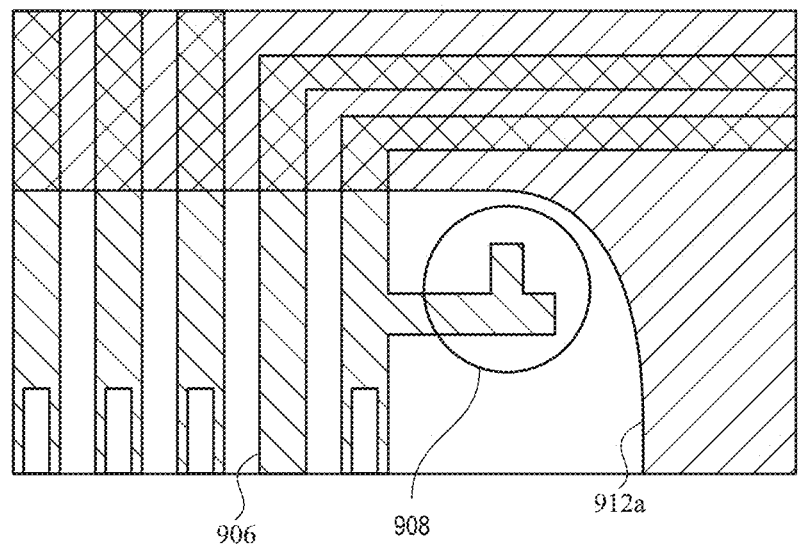
FIG. 9A illustrates a top view of an exemplary touch sensor panel according to some examples of the disclosure.

In some examples, the attenuation mask can be patterned in a manner that does not overlap one or more alignment features included in the touch sensor panel. FIG. 9A illustrates a top view of an exemplary touch sensor panel 900 according to some examples of the disclosure. In some examples, the touch sensor panel 900 can include traces 906 of metal layer (e.g., metal layers 520, 530, 620, or 630) and top passivation 912a. The traces 906 can be touch sensors or traces connecting the touch sensors to a bond pad, for example. In some examples, the traces 908 can include an alignment feature 908 that is used later in the manufacturing process when assembling touch sensor panel 900 into an electronic device including other components, such as a display, circuitry, bezel, etc. As shown in FIG. 9A, in some examples, the passivation layer does not completely cover the top of the touch sensor panel 900. For example, a masking layer similar to masking layer 514 or 614 can be used to prevent passivation from being deposited in one or more regions of the top of the touch sensor panel. In some examples, other techniques, such as any of the other techniques disclosed herein, can be used.

Figure 9B:
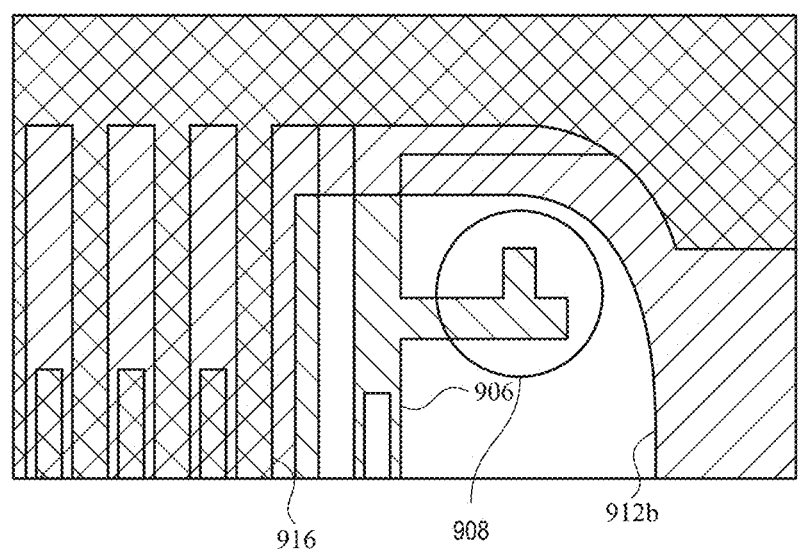
FIG. 9B illustrates a bottom view of an exemplary touch sensor panel according to some examples of the disclosure.

FIG. 9B illustrates a bottom view of the exemplary touch sensor panel 900 according to some examples of the disclosure. FIG. 9B illustrates the traces 906 and alignment feature 908 described above with reference to FIG. 9A. The touch sensor panel further includes attenuation mask 916 and bottom passivation 912b. Attenuation mask 916 can be patterned at locations that prevent passage of light from the bottom of the touch sensor panel stackup at locations between traces 906. Moreover, in some examples, attenuation mask 916 may not overlap with alignment feature 908. By patterning attenuation mask 916 in way that does not overlap with alignment feature 908, alignment feature 908 remains visible during subsequent steps of assembling the electronic device that includes touch sensor panel 900. In some examples, the attenuation mask 916 is solid with the exception of locations that doe not include the attenuation mask 916 (e.g., attenuation mask 916 is not patterned in one of the ways described above with reference to FIGS. 7A-7C). In some examples, however, attenuation mask 916 is patterned in the manner shown in FIG. 9B and in a manner illustrated in or similar to one or more of FIGS. 7A-7C. For example, an electrode patterned as shown in FIGS. 7A-7C is disposed in regions of the electronic device as shown in FIG. 9B. As shown in FIG. 9B, in some examples, the passivation layer does not completely cover the bottom of the touch sensor panel 900. For example, a masking layer similar to masking layer 514 or 614 can be used to prevent passivation from being deposited in one or more regions of the bottom of the touch sensor panel that are not covered by attenuation mask 906. In some examples, other techniques, such as any of the other techniques disclosed herein, can be used.

Figure 10A:
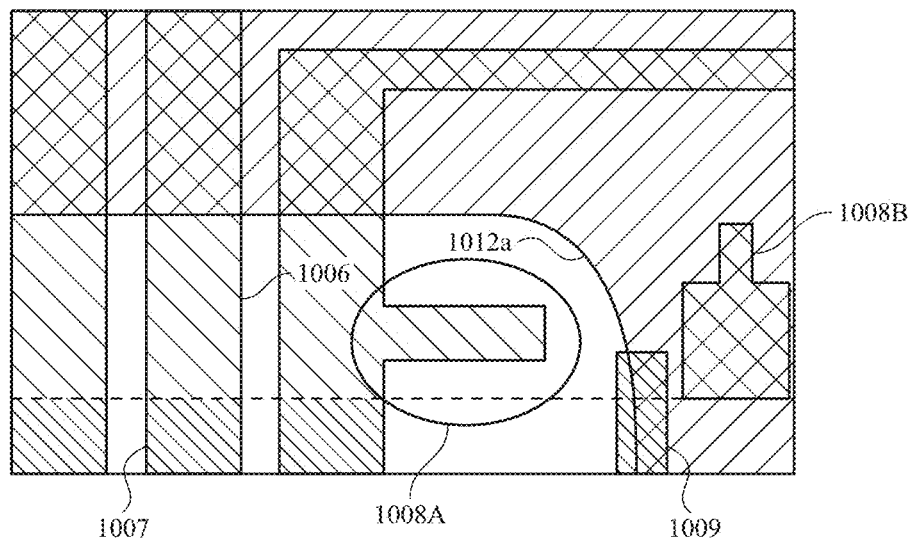
FIG. 10A illustrates a top view of an exemplary touch sensor panel according to some examples of the disclosure.

FIG. 10A illustrates a top view of an exemplary touch sensor panel 1000 according to some examples of the disclosure. Touch sensor panel 1000 includes metal traces 1006, ITO traces 1007, and top passivation 1012a. The metal traces 1006 can be included in a metal layer similar to metal layer 530 or 630 and the ITO traces 1007 can be included in an ITO layer similar to ITO layer 520 or 620. Metal traces 1006 can be touch sensor electrodes, part(s) of the bond pad, and/or conductive traces to the touch sensor electrodes or the bond pad, for example. The ITO traces 1007 can similarly be touch sensor electrodes, part(s) of the bond pad, and/or conductive traces to the touch sensor electrodes or the bond pad. In some examples, a layer of ITO can be disposed beneath the metal traces 1006.

Metal traces 1006 can include a first alignment feature 1008A and a second alignment feature 1008B, for example. In some examples, alignment feature 1008A and/or 1008B can be used in later fabrication steps of the electronic device including the touch sensor panel 1000. For example, alignment feature 1008A and/or 1008B can be used to properly align display hardware, other circuitry, and/or a bezel relative to the touch sensor panel 1000. In some examples, the top passivation 1012a may not overlap alignment feature 1008A.

ITO traces 1007 can include a section of ITO 1009 not covered by a metal trace 1006. In some examples, the section of ITO 1009 can be used to adhere upper passivation 1012a to the rest of the touch sensor panel 1000. In some examples, including the section of ITO 1009 can prevent the upper passivation 1009 from peeling during subsequent fabrication steps of the touch sensor panel 1000.

As shown in FIG. 10A, in some examples, the passivation layer does not completely cover the top of the touch sensor panel 1000. For example, a masking layer similar to masking layer 514 or 614 can be used to prevent passivation from being deposited in one or more regions of the top of the touch sensor panel 1000. In some examples, other techniques, such as any of the other techniques disclosed herein, can be used.

Figure 10B:
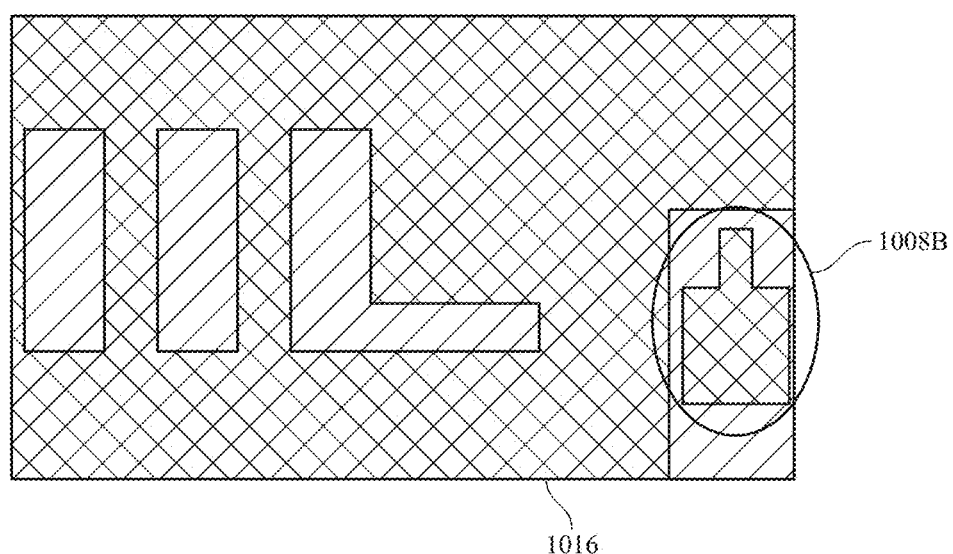
FIG. 10B illustrates a bottom view of an exemplary touch sensor panel according to some examples of the disclosure.

FIG. 10B illustrates a bottom view of the exemplary touch sensor panel 1000 according to some examples of the disclosure. The bottom view of the touch sensor panel 1000 can include bottom passivation covering the entire section of the bottom of the touch sensor panel 1000 shown in FIG. 10B. In some examples, the entire bottom surface of the touch sensor panel is covered by bottom passivation. Beneath bottom passivation, the touch sensor panel 1000 can include an attenuation mask 1016, which can be patterned to reveal alignment feature 1008B and one or more metal traces 1006 and/or ITO traces 1007 (e.g., a stackup of ITO traces 1007 and metal traces 1006). In some examples, the attenuation mask 1016 can be a continuous layer of material or can be patterned as shown in one or more of FIGS. 7A-7C.

In some examples, bottom passivation is fully or partially transparent, enabling alignment feature 1008B to be visible during subsequent fabrication steps of the electronic device incorporating touch sensor panel 1000 (e.g., forming/installing display circuitry, other circuitry, device housing or bezel).

Figure 11:
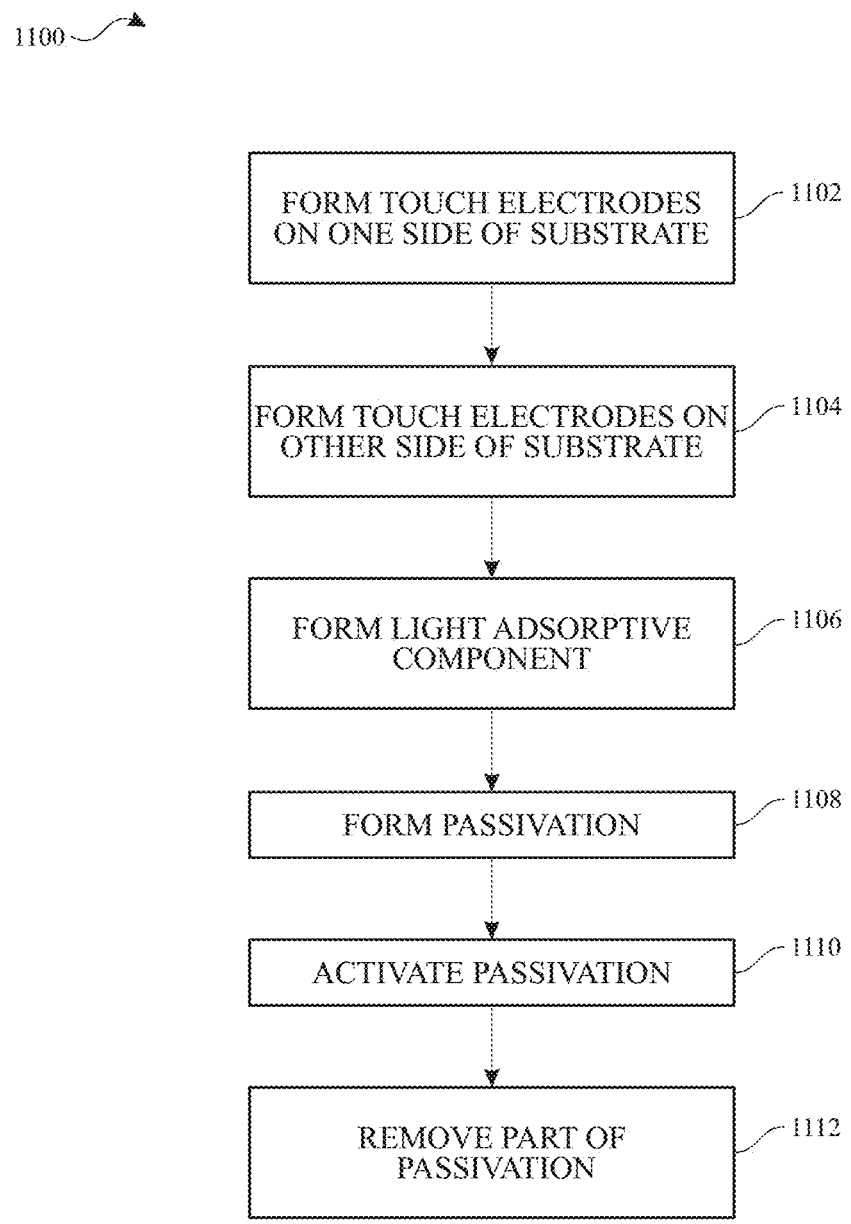
FIG. 11 illustrates an exemplary process for forming a touch sensor panel including light-transmissibility controlling techniques according to some examples of the disclosure.

FIG. 11 illustrates an exemplary process 1100 for forming a touch sensor panel including light-transmissibility controlling techniques according to some examples of the disclosure. For example, one or more of the touch sensor panels described above with reference to FIGS. 1A-9B can be formed according to process 1100.

In some examples, at 1102, a plurality of touch electrodes can be formed on one side of the substrate. The touch electrodes can be formed as row and column electrodes similar to those described above with reference to FIG. 4A or as touch node electrodes as described above with reference to FIG. 4B, for example. In some examples, either row electrodes 404 or column electrodes 406 can be formed on one side of the substrate and the other of the row or column electrodes can be formed on the other side of the substrate at 1104, described below. Forming the touch electrodes can include forming a layer of ITO similar to layer 520 or 620 and forming a metal layer similar to layer 530 or 630, for example. In some examples, one or more alignment features (e.g., alignment features 908, 1008a or 1008b) can be formed while forming the touch electrodes.

In some examples, at 1104, a plurality of touch electrodes can be formed on the other side of the substrate. The electrodes can be formed as row and column electrodes similar to those described above with reference to FIG. 4A or as touch node electrodes described above with reference to FIG. 4B, for example. In some examples, when one of row electrode or column electrodes were formed on one side of the substrate at 1102, the other of row and column electrodes can be formed on the other side of the substrate. Thus, in some examples, the touch sensor panel can include row electrodes on a first side of the substrate and column electrodes on a second side of the substrate. Forming the touch electrodes can include forming a layer of ITO similar to layer 520 or 620 and forming a metal layer similar to layer 530 or 630, for example. In some examples, one or more alignment features (e.g., alignment features 908, 1008a or 1008b) not formed at 1102 can be formed while forming the touch electrodes at 1104.

In some examples, at 1106, a light-absorptive component of the touch sensitive display can be formed. For example, an attenuation mask 616 can be formed on the bottom side of the substrate, including material in ITO layer 620 and metal layer 630. In some examples, the attenuation mask can be patterned according to one or more of FIGS. 7A-7C, 9B, or 10B. In some examples, the attenuation mask is a solid material layer patterned according to FIG. 9B or 10B. As another example, the light-absorptive component can be the substrate. For example, the substrate 610 can be formed of a material that absorbs light having a characteristic that activates the passivation layer (e.g., UV light) and transmits visible light. Thus, in some examples forming the light-absorptive component 1106 can be executed before forming the touch electrodes 1102-1104. As another example, in some examples, the light-absorptive component can be a light-absorptive layer 618. In some examples, the light-absorptive layer can be formed on a material layer different from the ITO layer 620 and the metal layer 630. As shown in FIG. 6C, the light-absorptive layer can be disposed between touch electrodes 604a and substrate 610. Thus, in some examples, forming the light-absorptive component 1106 can occur before or between forming the touch electrodes 1102-1104. In some examples, an additional masking layer 614 can be formed after passivation 1108 is formed.

In some examples, at 1108, passivation (e.g., passivation 512, 612, 812, 912, 1012) can be formed on both sides of the substrate. The passivation can be formed from a transparent non-conductive material that becomes activated when exposed to light having a particular characteristic (e.g., light having at least a threshold intensity, light that is persistent for at least a threshold period of time, light that has a particular wavelength, such as UV light), for example.

In some examples, at 1110, the passivation formed at 1108 can be activated. For example, the passivation can be activated by exposing the touch sensor panel to activating light from both sides of the substrate. In some examples, portions of the passivation that are activated will remain when other portions of the passivation are removed at 1112.

In some examples, at 1112, parts of the passivation not activated by the light can be removed. For example, the touch sensor panel can be exposed to a chemical that removes portions of the passivation that were not activated by the light that was applied at 1110. For example, a portion of the passivation overlapping a bond pad of the touch sensor panel can be removed, enabling subsequent formation of an electrical connection to the bond pad.

Thus, in some examples, a touch sensor panel can be formed according to process 1100. Additional or alternate operations can be performed when forming the touch sensor panel and the order in which operations 1102-1112 are performed can vary depending on the design of the touch sensor panel.

Therefore, according to the above, some examples of the disclosure are directed to touch sensor panel designs that selectively prevent light with enough intensity to activate the passivation layer used in the touch sensor panels to reach the passivation layer on the opposite side of the substrates of the touch sensor panels.

In accordance with the above, some examples of the disclosure are directed to a touch sensor panel comprising: a substrate including a first side and a second side; a passivation layer; a first plurality of touch electrodes formed on the first side of the substrate; and a second plurality of touch electrodes formed on the second side of the substrate, wherein a component of the touch sensor panel, other than the first plurality of touch electrodes and the second plurality of touch electrodes, is configured to prevent light configured to activate the passivation layer during fabrication of the touch sensor panel from being transmitted from the first side of the substrate to the second side of the substrate. Additionally or alternatively to the above, in some examples, the component is the substrate, and the substrate is configured with a transmissivity less than or equal to a transmissivity threshold at which an intensity of the light transmitted from the first side of the substrate to the second side of the substrate is equal to an activation intensity threshold of the passivation layer. Additionally or alternatively to the above, in some examples, the component is an attenuation mask formed in a same material layer as the first plurality of touch electrodes. Additionally or alternatively to the above, in some examples, the attenuation mask is not patterned. Additionally or alternatively to the above, in some examples, the attenuation mask is patterned. Additionally or alternatively to the above, in some examples, the pattern of the attenuation mask is such that a transmissivity of the patterned attenuation mask is less than or equal to a transmissivity threshold at which an intensity of the light transmitted from the first side of the substrate to the second side of the substrate is equal to an activation intensity threshold of the passivation layer. Additionally or alternatively to the above, in some examples, the component is a light-absorptive layer formed on the first side or the second side of the substrate, and the light-absorptive layer is configured with a transmissivity less than or equal to a transmissivity threshold at which an intensity of the light transmitted from the first side of the substrate to the second side of the substrate is equal to an activation intensity threshold of the passivation layer.

Some examples of the disclosure are directed to a method of fabricating a touch sensor panel, the method comprising: forming a first plurality of touch electrodes on a first side of a substrate of the touch sensor panel; forming a second plurality of touch electrodes on a second side of the substrate of the touch sensor panel; and forming and activating a first passivation layer on the first side of the substrate and a second passivation layer on the second side of the substrate, wherein a component of the touch sensor panel, other than the first plurality of touch electrodes and the second plurality of touch electrodes, is configured to prevent light configured to activate the passivation layer during the activation from being transmitted from the first side of the substrate to the second side of the substrate. Additionally or alternatively to the above, in some examples, the component is the substrate, and the substrate is configured with a transmissivity less than or equal to a transmissivity threshold at which an intensity of the light transmitted from the first side of the substrate to the second side of the substrate is equal to an activation intensity threshold of the passivation layer. Additionally or alternatively to the above, in some examples, the component is an attenuation mask formed in a same material layer as the first plurality of touch electrodes. Additionally or alternatively to the above, in some examples, the attenuation mask is not patterned. Additionally or alternatively to the above, in some examples, the attenuation mask is patterned. Additionally or alternatively to the above, in some examples, the pattern of the attenuation mask is such that a transmissivity of the patterned attenuation mask is less than or equal to a transmissivity threshold at which an intensity of the light transmitted from the first side of the substrate to the second side of the substrate is equal to an activation intensity threshold of the passivation layer. Additionally or alternatively to the above, in some examples, the component is a light-absorptive layer formed on the first side or the second side of the substrate, and the light-absorptive layer is configured with a transmissivity less than or equal to a transmissivity threshold at which an intensity of the light transmitted from the first side of the substrate to the second side of the substrate is equal to an activation intensity threshold of the passivation layer.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel comprising:
a substrate including a first side and a second side;
a passivation layer;
a first plurality of touch electrodes formed on the first side of the substrate; and
a second plurality of touch electrodes formed on the second side of the substrate,
wherein a component of the touch sensor panel, other than the first plurality of touch electrodes and the second plurality of touch electrodes, is configured to prevent light configured to activate the passivation layer during fabrication of the touch sensor panel from being transmitted from the first side of the substrate to the second side of the substrate, the component configured with a transmissivity less than or equal to a transmissivity threshold at which an intensity of the light transmitted from the first side of the substrate to the second side of the substrate is equal to an activation intensity threshold of the passivation layer.

2. The touch sensor panel of claim 1, wherein:
the component is the substrate.

3. The touch sensor panel of claim 1, wherein:
the component is an attenuation mask formed in a same material layer as the first plurality of touch electrodes.

4. The touch sensor panel of claim 3, wherein the attenuation mask is not patterned.

5. The touch sensor panel of claim 3, wherein the attenuation mask is patterned.

6. The touch sensor panel of claim 5, wherein the pattern of the attenuation mask is such that the attenuation mask does not overlap an alignment feature included in the same material layer as the first touch electrodes.

7. The touch sensor panel of claim 1, wherein:
the component is a light-absorptive layer formed on the first side or the second side of the substrate.

8. A method of fabricating a touch sensor panel, the method comprising:
forming a first plurality of touch electrodes on a first side of a substrate of the touch sensor panel;
forming a second plurality of touch electrodes on a second side of the substrate of the touch sensor panel; and
forming and activating a first passivation layer on the first side of the substrate and a second passivation layer on the second side of the substrate,
wherein a component of the touch sensor panel, other than the first plurality of touch electrodes and the second plurality of touch electrodes, is configured to prevent light configured to activate the passivation layer during the activation from being transmitted from the first side of the substrate to the second side of the substrate, the component configured with a transmissivity less than or equal to a transmissivity threshold at which an intensity of the light transmitted from the first side of the substrate to the second side of the substrate is equal to an activation intensity threshold of the passivation layer.

9. The method of claim 8, wherein:
the component is the substrate.

10. The method of claim 8, wherein:
the component is an attenuation mask formed in a same material layer as the first plurality of touch electrodes.

11. The method of claim 10, wherein the attenuation mask is not patterned.

12. The method of claim 10, wherein the attenuation mask is patterned.

13. The method of claim 12, wherein the pattern of the attenuation mask is such that the attenuation mask does not overlap an alignment feature included in the same material layer as the first touch electrodes.

14. The method of claim 10, wherein:
the component is a light-absorptive layer formed on the first side or the second side of the substrate.

\* \* \* \* \*